US008091777B2

(12) United States Patent
Takahashi

(10) Patent No.: US 8,091,777 B2
(45) Date of Patent: Jan. 10, 2012

(54) MONITORING APPARATUS

(75) Inventor: Masahiro Takahashi, Tokyo (JP)

(73) Assignee: Laurel Precision Machines Co., Ltd., Osaka (JP)

( * ) Notice: Subject to any disclaimer, the term of this patent is extended or adjusted under 35 U.S.C. 154(b) by 0 days.

(21) Appl. No.: 11/798,378

(22) Filed: May 14, 2007

(65) Prior Publication Data

US 2007/0267481 A1 Nov. 22, 2007

(30) Foreign Application Priority Data

May 17, 2006 (JP) ................................ 2006-137431

(51) Int. Cl.
*G06Q 40/00* (2006.01)

(52) U.S. Cl. ........................................ 235/379; 235/375

(58) Field of Classification Search .................. 235/379, 235/380, 382, 375, 7 R, 22; 200/61.61; 109/2; 186/37; 340/568.2, 568.3, 571, 572.1, 545.6, 340/545.7; 705/21, 5, 35–45
See application file for complete search history.

(56) References Cited

U.S. PATENT DOCUMENTS 4,257,038 A 3/1981 Rounds et al.
4,595,985 A * 6/1986 Sakakiya ........................ 705/18
5,615,625 A 4/1997 Cassidy et al.
5,799,288 A * 8/1998 Tanaka et al. ................... 705/43
6,259,356 B1 7/2001 Tamaoki et al.
6,472,993 B1 10/2002 Addy
6,575,833 B1 * 6/2003 Stockdale ....................... 463/29
6,646,550 B1 11/2003 Runyon et al.
6,921,990 B1 7/2005 Higgins
6,980,100 B1 12/2005 Hammond
7,113,091 B2 9/2006 Script et al.
7,330,108 B2 * 2/2008 Thomas ........................ 340/505
7,342,497 B2 * 3/2008 Chung et al. ............... 340/572.1
7,386,471 B1 * 6/2008 Nack .............................. 705/21
7,651,530 B2 * 1/2010 Winick ........................... 726/35
2004/0070506 A1 4/2004 Runyon et al.
2004/0212493 A1 10/2004 Stilp
2005/0010525 A1 * 1/2005 Ross et al. ...................... 705/43
2005/0242950 A1 11/2005 Lindsay et al.
(Continued)

FOREIGN PATENT DOCUMENTS

DE 101 02 283 A1 9/2001
(Continued)

OTHER PUBLICATIONS

Office Action issued on Jul. 19, 2011 in Japanese Patent Application No. 2006-137431with English translation, 4 pp.

(Continued)

*Primary Examiner* — Daniel Hess
*Assistant Examiner* — Matthew Milkels
(74) *Attorney, Agent, or Firm* — Nixon & Vanderhye P.C.

(57) ABSTRACT

A monitoring apparatus for monitoring open/close statuses of open/close portions (5) of multiple money processing machines (1) includes: a reader monitoring apparatus (3) which monitors open/close status of the open/close portion (5) of each of the multiple money processing machines (1) by using an RFID inlet (6) and an RFID reader (4); and a control apparatus (2) for monitoring a processing status of each of the multiple money processing machines (1). If the reader monitoring apparatus (3) detects that the open/close portion (5) of the money processing machine (1) is opened, and if the control apparatus (2) determines that the money processing machine (1) is not operating, an alarm signal is output.

11 Claims, 3 Drawing Sheets

U.S. PATENT DOCUMENTS

| | | | |
|---|---|---|---|
| 2006/0055552 A1 | 3/2006 | Chung et al. | |
| 2006/0087436 A1 | 4/2006 | Reddy et al. | |
| 2006/0214789 A1 | 9/2006 | Posamentier et al. | |

FOREIGN PATENT DOCUMENTS

| | | | | |
|---|---|---|---|---|
| EP | 0 692 599 | A1 | | 1/1996 |
| GB | 2244584 | A | * | 12/1991 |
| JP | 51-70494 | | | 6/1976 |
| JP | 57-173249 | A | * | 10/1982 |
| JP | 03-225498 | | | 10/1991 |
| JP | 10-159415 | | | 6/1998 |
| JP | 2001-283356 | | | 10/2001 |
| JP | 2003-173477 | | | 6/2003 |
| JP | 2004-171235 | | | 6/2004 |
| JP | 2005-011409 | | | 1/2005 |
| JP | 2005-222336 | | | 8/2005 |
| JP | 2005-254558 | | | 9/2005 |
| JP | 2005-290831 | | | 10/2005 |
| JP | 2005-292934 | | | 10/2005 |
| JP | 2006-031409 | | | 2/2006 |
| JP | 2006-31534 | | | 2/2006 |
| JP | 2006-139680 | | | 6/2006 |
| KR | 20-0379853 | | | 3/2005 |
| TW | I242173 | | | 10/2005 |
| WO | WO 2005/111925 | A1 | | 11/2005 |
| WO | WO 2005/111961 | | | 11/2005 |
| WO | WO 2006000016 | A1 | * | 1/2006 |

OTHER PUBLICATIONS

Notice of Allowance issued on Oct. 4, 2011 in Japanese Patent Application No. 2006-137431 with English translation, 6 pp.

Office Action issued on Nov. 15, 2011 in Japanese Patent Application No. 2006-084351with English translation, 4 pp.

* cited by examiner

MONITORING APPARATUS

BACKGROUND OF THE INVENTION

1. Field of the Invention

The present invention relates to a monitoring apparatus for money processing machines such as an ATM (automated teller machine), a cash dispenser, a coin counter, a coin wrapping machine, a currency counter, a note sorter.

Priority is claimed on Japanese Patent Application No. 2006-137431, filed May 17, 2006, the content of which is incorporated herein by reference.

2. Description of the Related Art

A monitoring apparatus is known which detects by using a sensor that an open/close portion such as a door, a drawer and the like of the money processing machine is opened by a person who is not a regular or authorized operator, and which issues an alarm or calls on a security service company based on a detection signal output from the sensor (for example, Japanese Patent Application, First Publication No. 2001-283356).

In general, electric power is necessary for driving the above-described sensor. However, if electrical power for driving this sensor is supplied from a power supply circuit of an apparatus such as the money processing machine, when a power supply to this apparatus is stopped, electric power is not supplied to the above-described sensor and the like, and it is not possible to continue monitoring the open/close portion. On the other hand, in order to continue driving the above-described sensor even when the power supply to an apparatus such as the money processing machine is stopped, there are proposals of methods in which, for example, the electric power is directly supplied to the sensor via a line from a main body of the monitoring apparatus provided outside the apparatus such as the money processing machine, or a no-voltage contact is provided which is directly connected to a main body of the monitoring apparatus. However, with respect to these proposals, there are problems in which a line from a main body of the monitoring apparatus is necessary and, for example, a moving range is limited when an arrangement of the apparatus is changed. Moreover, there is another problem in which, in order to solve the limitation of the moving range, a new line for the sensor should be provided.

Moreover, there is another proposal in which, in order to omit the line for the sensor, a battery for a power supply to the above-described sensor and the like is provided inside the apparatus. However, there are further problems in which, for example, the apparatus becomes bigger when the battery is provided, and cost increases because a number of parts increases and the battery should be maintained.

By the way, in financial institutions or offices of the financial institutions, in general, multiple money processing machines which are monitored are provided, and opening/closing operations of these money operation machines are monitored by a centralized monitoring at night time when these money processing machines are not operating. However, in accordance with such a monitoring method, for example, in a case in which some of the money processing machines are operating and other money processing machines are not operating, if the monitoring apparatus is started in order to monitor the money processing machines which are not operating, an alarm is unnecessarily raised when the open/close portion of the operating money processing machine is opened even though this is not needed to be monitored. This is because information of the money processing machine is stored as log data when the money processing machine is operating. On the other hand, if the monitoring is canceled with respect to all money processing machines when some of the money processing machines are operating, there is a problem in which it is not possible to detect even when the open/close portion of the money processing machine which is not operating is opened.

SUMMARY OF THE INVENTION

The present invention is conceived in order to solve the above-described problems, and has objects to omit the lines applied to the sensor for monitoring the open/close portion, to prevent the money processing machine from becoming larger, to prevent an increase of the number of parts of the money processing machine, to prevent an increase of the cost for maintenance of the money processing machine, and to prevent an unnecessary alarm being raised because of opening the open/close portion of the money processing machine while operating.

In order to solve the above-described problems, as one of concrete examples of the present invention, a first aspect of the present invention is a monitoring apparatus for monitoring an open/close status of open/close portions (for example, an open/close portion 5 of following embodiments) of multiple money processing machines (for example, money processing machines 1 of following embodiments), including: an open/close detection unit (for example, a reader monitoring apparatus 3 of the following embodiments) which detects the open/close status of the open/close portion of each of the multiple money processing machines and which includes: an RFID inlet (for example, an RFID inlet 6 of the following embodiments) which stores individually different ID information and which is attached to each of the multiple money processing machines; and an RFID reader (for example, an RFID reader 4 of following embodiments) which is independently provided outside the money processing machine; an operation status monitoring system (for example, a control apparatus 2 of the following embodiments) monitoring an operation status of each of the multiple money processing machines; and an alarm output unit (for example, step 6 of the following embodiments) which outputs an alarm signal if the open/close detection unit detects that the open/close portion is opened and if the operation status monitoring system determines that the money processing machine is not operating.

In accordance with such a constitution, the open or close state of the open/close portion is detected based on a transmission/reception state of the ID information between the RFID inlet provided at the money processing machine and the RFID reader provided outside the money processing machine. Therefore, it is possible to monitor the open or closed state of the open/close portion without providing a power supply line or a battery.

Moreover, the stored ID information is respectively different with respect to the RFID inlets. Therefore, it is possible to detect the RFID inlet which transmitted the ID information based on the ID information received by the RFID reader. Hence, it is possible to detect the money processing machine which has the open/close portion that is opened by detecting the RFID inlet.

Furthermore, the alarm signal is output only when the money processing machine is not operating which has the open/close portion that is detected to be opened. Therefore, even when some of the money processing machines are operating, it is possible to selectively monitor the open/close portions of the money processing machines which are not operating.

A second aspect of the present invention can be the above-described monitoring apparatus, wherein the ID information includes information for detecting or determining the money processing machine and the open/close portion to which the RFID inlet is provided.

In accordance with such a constitution, it is possible to detect both the money processing machine to which the RFID inlet is attached and the open/close portion based on the ID information received via the above-described RFID reader.

A third aspect of the present invention can be the above-described monitoring apparatus, wherein the open/close portion is a drawer, and the ID information includes information indicating or corresponding to the drawer.

In accordance with such a constitution, in reference to the received ID information, it is possible to detect that the open/close portion of the money processing machine to which the RFID inlet is attached is a drawer.

A fourth aspect of the present invention can be the above-described monitoring apparatus, wherein the open/close portion is a door, and the ID information includes information indicating or corresponding to the door.

In accordance with such a constitution, in reference to the received ID information, it is possible to detect that the open/close portion of the money processing machine to which the RFID inlet is attached is a door.

A fifth aspect of the present invention can be the above-described monitoring apparatus which further includes a memory unit which stores or records the ID information and a time at which the ID information was received by the RFID reader.

In accordance with such a constitution, it is possible to store the received ID information together with the time at which the ID information is received by the RFID reader by using the memory unit. Therefore, it is possible to confirm both the ID information and the time at which the ID information is received afterward.

A sixth aspect of the present invention can be the above-described monitoring apparatus wherein a case of the money processing machine and the open/close portion include shielding materials.

In accordance with such a constitution, when the open/close portion is in a blocked or closed state, electric wave for activating the RFID inlet is blocked by the shield material and does not reach the RFID inlet. On the other hand, when the open/close portion is opened, the electric wave for activating the RFID inlet is not blocked by the shield material and reach the RFID inlet, and the RFID is activated. Therefore, it is possible to receive the ID information via the RFID reader only while the open/close portion is opened.

A seventh aspect of the present invention can be the above-described monitoring apparatus further including an alarm unit which raises an alarm based on the alarm signal.

In accordance with such a constitution, when the open/close portion of the money processing machine which is not operating is opened, it is possible to raise an alarm.

An eighth aspect of the present invention can be the above-described monitoring apparatus further including a communication unit for transmitting the alarm signal to a monitoring center.

In accordance with such a constitution, in a case in which an alarm signal is output because it is detected that the open/close portion of the money processing machine which is not operating is opened, it is possible to automatically notify the monitoring center of the event via the communication unit.

A ninth aspect of the present invention can be the above-described monitoring apparatus wherein the monitoring apparatus includes a plurality of the RFID readers.

In accordance with such a constitution, it is possible to receive the ID information transmitted from the RFID inlet by using the RFID readers which are available among the multiple RFID readers.

DETAILED DESCRIPTION OF THE INVENTION

A monitoring apparatus of a first embodiment of the present invention is explained hereinbelow in reference to FIGS. 1 and 2.

Figure 1:
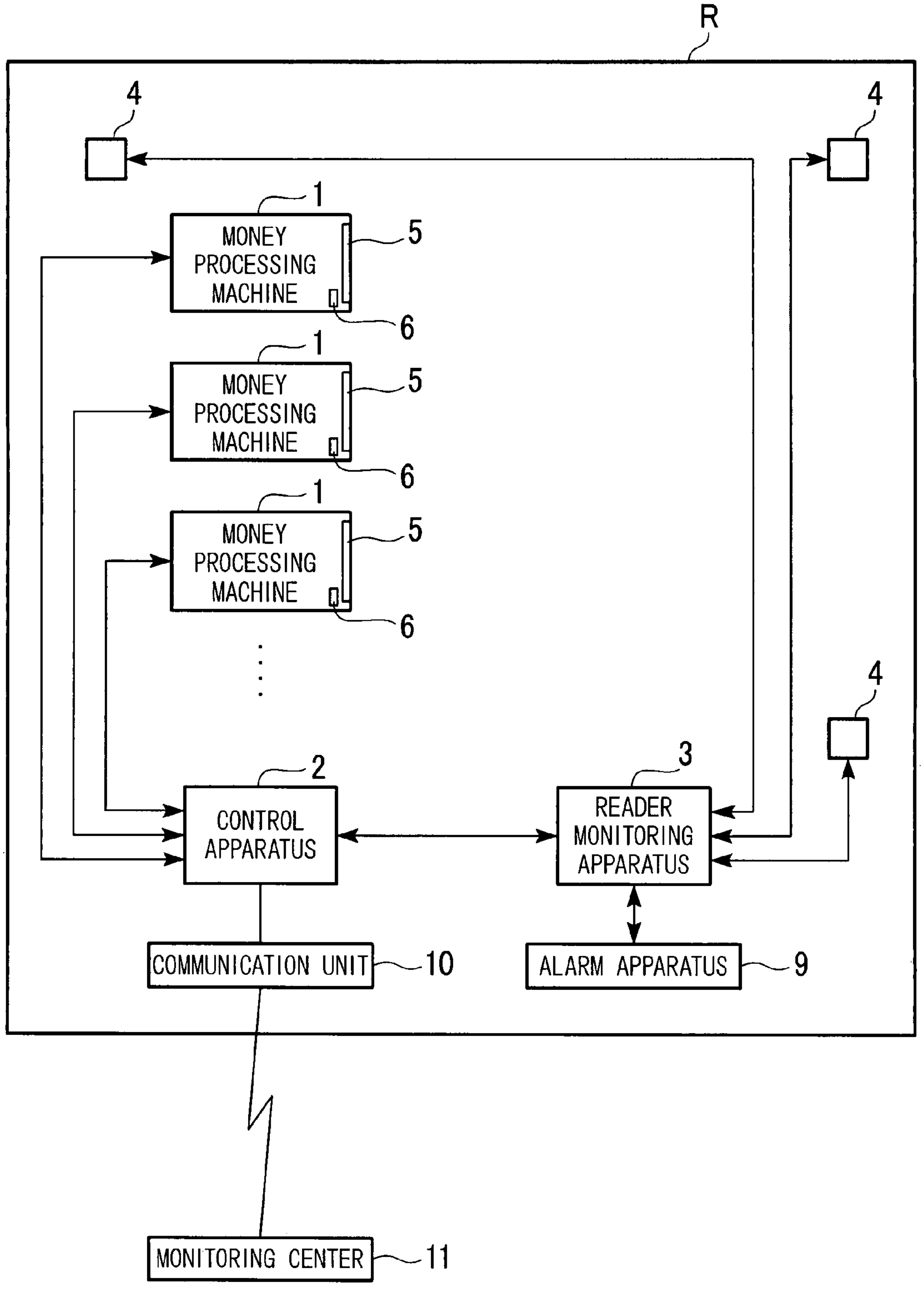
FIG. 1 is an outline schematic diagram of a monitoring apparatus of an embodiment of the present invention.

FIG. 1 shows an overall constitution of the monitoring apparatus of this embodiment, and shows an example in an office or the like of a financial institution such as a bank in which multiple money processing machines are monitored that are set inside a predetermined room such as an accounting room.

As shown in FIG. 1, multiple money processing machines 1 are set inside a predetermined room R. The money processing machines 1 receive and deliver or dispense money, and it is possible to save, reserve or pool money inside the machines.

In a concrete case, for example, when the money processing machine 1 deals with money, the money processing machine 1 takes one or multiple sheets of paper money into the machine one by one which are put into a money entrance aperture of the machine by an operator, a check portion checks denomination, genuineness, damage and the like while counting the money, and after that, the money processing machine 1 determines to return the money or to accept the money in accordance with a confirmation operation by the operator. If the operator inputs a command to pay money, the money processing machine 1 pays money corresponding to the required denomination and required amount from a payment aperture. Inside the money processing machine 1, multiple stackers (not shown in figures) are provided in order to save or store money which is received or which will be paid in accordance with denomination. It should be noted that the above explanation is related to a case in which the money processing machine 1 deals with paper money. However, it is possible that the money processing machine 1 deal with coins or hard money.

Moreover, each of multiple money processing machines 1 has an open/close portion 5 so as to be openable. It is possible to take out a stacker set inside the money processing machine 1 after opening the open/close portion 5. It should be noted that the open/close portion 5 should be provided so as to be openable, and for example, the open/close portion 5 is constituted from a door, a drawer or the like. Moreover, it is possible that one money processing machine 1 be provided with multiple open/close portions 5.

Figure 2:
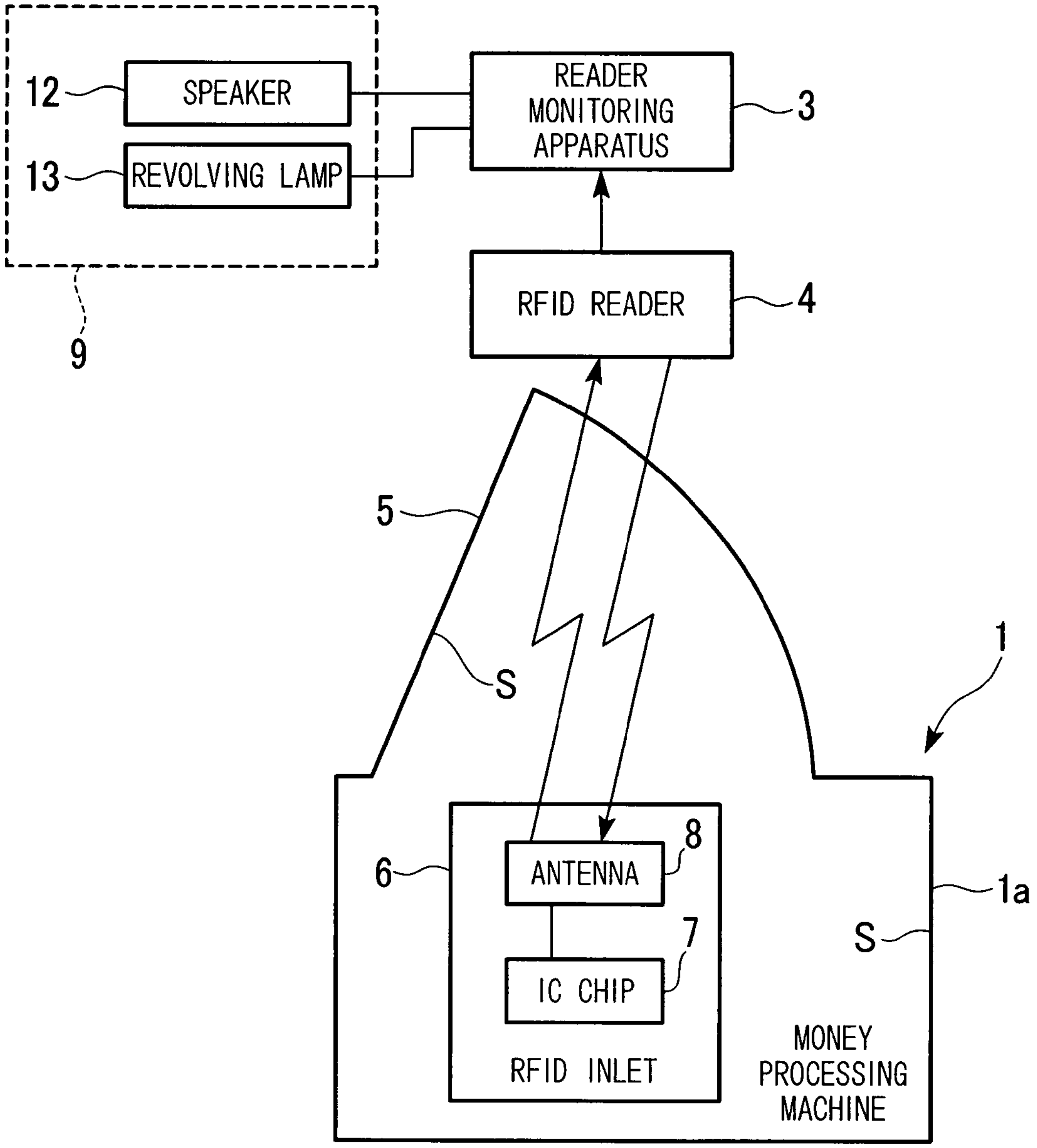
FIG. 2 is a partial schematic drawing of a monitoring apparatus of an embodiment of the present invention.

A case 1*a* of the money processing machine 1 and the above-described open/close portion 5 are, as shown in FIG. 2, formed from a shielding material S. The shielding material S is the material which blocks predetermined electric waves transmitted from a RFID reader 4 described below. It is possible to appropriately select the shielding material S from various types of the shielding materials in accordance with a waveband of the above-described predetermined electric waves. In other words, when the open/close portion 5 is closed, the predetermined electric waves do not pass inside the case 1*a*, and when the open/close portion 5 is open, the predetermined electric wave comes inside the case 1*a* via the open/close portion 5.

Here, it should be noted that, other than forming the case 1*a* and the open/close portion 5 of the money processing machine 1 with the shielding material S, it is possible to cover outside or inside surfaces of both the case 1*a* and the open/close portion 5 of the money processing machine 1 with the shielding material S. Moreover, it is possible that an RFID inlet (described below) be set inside a small shielded box which is independently provided from the case 1*a* and which is covered with the shielding material S. In this case, it is possible to provide an open/close member at the shielded box so as to be linked or connected to the open/close portion 5. Therefore, it is possible that the open/close member be opened only when the open/close portion 5 is opened, and the electric waves pass into the shielded box from outside of the case 1*a*.

Inside the open/close portion 5 of each of the multiple money processing machines 1, an RFID (Radio Frequency IDentification) inlet 6 is attached. The RFID inlet 6 is activated when electric waves transmitted from an RFID reader 4 which is explained below are received, and the RFID inlet 6 automatically transmits ID information which is stored in the RFID reader 4 beforehand.

In a more concrete case, the RFID inlet 6 has an IC chip 7. The IC chip 7 stores ID information which corresponds to a position at which the RFID inlet 6 is set. With respect to the ID information, for example, it is possible that an ID assigned to each of the money processing machine be included. Moreover, if the money processing machine 1 provides multiple open/close portions 5, it is possible that the ID information include an ID corresponding to each of the multiple open/close portions 5. Furthermore, if there are multiple types of the open/close portions 5 such as a door or a drawer, it is possible that the ID information include an ID which corresponds to the door or an ID which corresponds to the drawer. It should be noted that it is possible that information other than the above-described ID be included in the ID information. In FIG. 2, only one of the multiple money processing machines 1 is shown, and only one of three RFID readers 4 is shown because of convenience of drawing.

An antenna 8 is connected to the IC chip 7 for transmitting the ID information stored beforehand via wireless communication. This antenna 8 is formed in a coil shape (not shown in figures), and it is possible to induce electric power for activating the IC chip 7 by receiving predetermined electric waves transmitted from the RFID reader 4 at a portion of the coil. Here, the above-described predetermined electric waves have a predetermined waveband corresponding to, for example, a number of turns of the coil and a diameter of the coil of the antenna 8. Therefore, if the antenna 8 receives electric waves other than the predetermined waveband, that is, external noise and the like, the antenna 8 does not induce the electric power for activating the IC chip 7. It should be noted that, with respect to an arrangement of the RFID inlet 6, it is possible to set the RFID inlet 6 anywhere inside the case 1*a*, but it should be noted that the RFID inlet should be set at a position at which communication between the RFID inlet 6 and the RFID reader 4 is blocked when the open/close portion 5 is closed, and at which the RFID inlet 6 and the RFID reader 4 can communicate when the open/close portion 5 is opened, for example, the RFID inlet 6 can be set on an inside surface of the case 1*a* or on an inside surface of the open/close portion 5.

On the other hand, the multiple RFID readers 4 are independently set outside the money processing machine 1. These RFID readers 4 transmit electric waves at the predetermined waveband to the RFID inlet 6 in order to activate the above-described IC chip 7, and receive the ID information transmitted via wireless communication from the RFID inlet 6. These RFID readers 4 are set at positions inside the room R so as to have predetermined gaps or intervals to each other. Moreover, the RFID readers are set at positions at which, when any one of the above-described multiple open/close portions 5 is opened, one or more RFID readers 4 can receive the ID information transmitted from each of the RFID inlets 6, and each of the RFID inlets 6 can receive the electric waves of the predetermined waveband transmitted from one or more than one of the RFID readers 4. Here, the RFID reader 4 has a constitution in which one RFID reader 4 can communicate with multiple RFID inlets 6.

On the other hand, as shown in FIG. 1, multiple RFID readers 4 are connected to a reader monitoring apparatus 3 (open/close monitoring unit). When the ID information transmitted from the RFID inlet 6 is received by the RFID reader 4, the ID information is transmitted to the reader monitoring apparatus 3. The reader monitoring apparatus 3 detects whether or not the open/close portion 5 is opened based on the received ID information from the RFID reader 4. Moreover, the reader monitoring apparatus 3 is set to output an alarm signal based on the ID information received by the RFID reader 4 and an operation state of the money processing machine 1. Here, a constitution is applied in which electric power for driving the RFID reader 4 is supplied from the reader monitoring apparatus 3. Moreover, the alarm signal is a contact signal of ON/OFF. For example, the alarm signal is set so as to be ON if the money processing machine 1 corresponding to the received ID information of the RFID inlet 6 is not operating, and so as to be OFF in other cases. It should be noted that it is possible to reverse ON/OFF of the alarm signal. In this case, an OFF signal is output if the money processing machine 1 corresponding to the ID information of the detected RFID inlet 6 is not operating.

Moreover, an alarm apparatus 9 (alarm unit) which is constituted from, for example, a speaker 12 and a revolving light 13 is connected to the reader monitoring apparatus 3. This alarm apparatus 9 is set to raise an alarm by operating or controlling the speaker 12, the revolving lamp 13 and the like in accordance with an alarm signal output from the reader monitoring apparatus 3. It should be noted that the speaker 12 and the revolving lamp 13 are not limitations, and it is possible to provide anything which can raise an alarm.

Moreover, the reader monitoring apparatus 3 has a memory (not shown in the drawings) as a memory unit, and it is possible to store or record the ID information received by the RFID reader 4 together with a time at which the ID information was received. The ID information and the reception time recorded in this memory are output in accordance with a request from a terminal which is connected via a communication network, and for example, it is possible to display in a list on the terminal such as a monitor of a PC. It should be noted that it is possible to provide the above-described memory at a control apparatus 2 (described below) which is connected to the reader monitoring apparatus 3.

The control apparatus 2 (operation status monitoring system) is connected to the multiple money processing machines 1 in the room R and conducts an online centralized administration of various states including the operational states of the money processing machines 1. The control apparatus 2 has a constitution in which it is possible to successively gather or collect information related to states of the money processing machines 1 such as an ON/OFF state of a power switch and information of the amount of received money inside the stacker. Moreover, the control apparatus 2 stores beforehand both the ID information of the RFID inlets 6 and information of the money processing machines 6 to which the RFID inlets 6 are attached while maintaining one-to-one correspondence among them. Here, with respect to a detection of an operation state of the money processing machine 1, it is determined that the money processing machine 1 is operating if the power switch of the money processing machine 1 is ON, and it is determined that the money processing machine 1 is not operating if the power switch of the money processing machine 1 is OFF. More concretely, an operation state of the money processing machine 1 is determined based on whether or not a signal is detected which is output when the power switch of the money processing machine 1 is in an ON state and which is input to the control apparatus 2 connected to the money processing machine 1. If the control apparatus 2 receives the predetermined signal from the money processing machine 1, it is determined that the corresponding money processing machine 1 is operating. If the control apparatus 2 does not receive the predetermined signal from the money processing machine 1, it is determined that the corresponding money processing machine 1 is not operating. There is another constitution in which the control apparatus 2 successively transmits a signal to each of the money processing machines 1 in a predetermined interval, and an operation state of the money processing machine 1 is determined based on whether or not a response signal is detected which is transmitted from the money processing machine 1. If the control apparatus 2 receives the response signal from the money processing machine 1, it is determined that the corresponding money processing machine 1 is operating. If the control apparatus 2 does not receive the response signal in the predetermined or longer interval from the money processing machine 1, it is determined that the corresponding money processing machine 1 is not operating.

Moreover, the above-described reader monitoring apparatus 3 is connected to the control apparatus 2 so as to be able to conduct a two-way communication. The ID information of the RFID inlet 6 corresponding to the money processing machine 1 which is determined to be in a state of stopping its operation is transmitted to the reader monitoring apparatus 3, and on the other hand, an alarm signal is transmitted to the control apparatus 2 from the reader monitoring apparatus 3. Moreover, a communication apparatus 10 (communication unit) for communicating to a monitoring center 11 is connected to the control apparatus 2, and the alarm signal transmitted from the RFID reader 4 is transmitted or forwarded to the monitoring center 11 via the communication apparatus 10. Here, the control apparatus 2 is always maintained in an operating state even if power switches of all of the money processing machines 1 are turned off. It should be noted that, instead of the above-described alarm signal, it is possible to transmit data or something which includes both the ID information received by the RFID reader 4 and a state of the corresponding money processing machine 1, to the monitoring center 11 via the communication apparatus 10.

Figure 3:
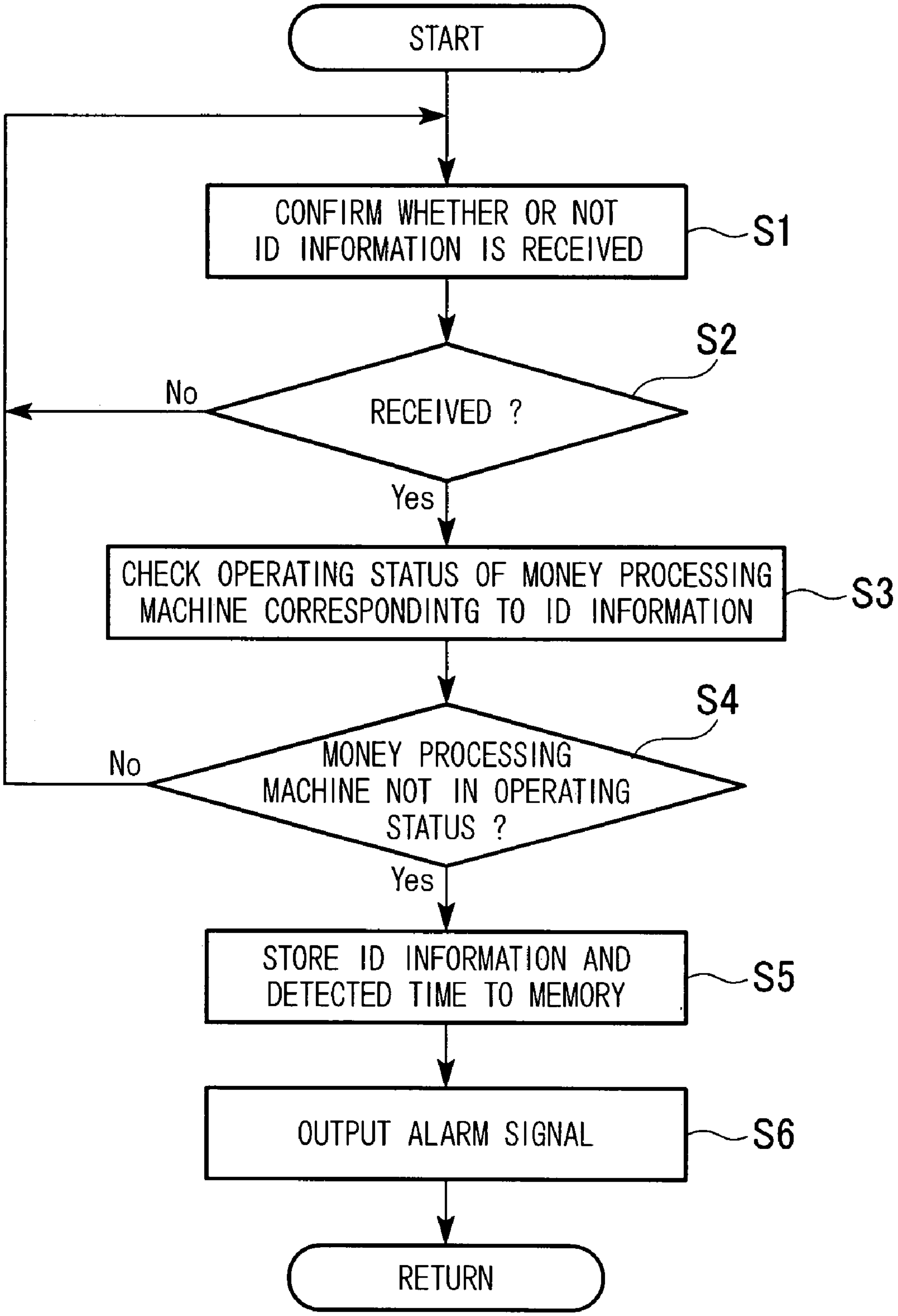
FIG. 3 is a flowchart showing an output determination operation of an alarm signal of an embodiment of the present invention.

Next, in reference to FIG. 3, an output determination operation of the alarm signal conducted by the reader monitoring apparatus 3 is explained.

First, in step S1, it is checked whether or not the RFID reader 4 has received the ID information. In step S2, it is determined whether or not the ID information is received. If a determination result is "YES" (received), the operation proceeds to step S3. If a determination result is "NO" (not received), the operation returns to step S1 and repeats the above-described operations.

Next, in step S3, an operation state of the money processing machine 1 corresponding to the ID information received by the RFID reader 4 is checked. Concretely, the ID information corresponding to the money processing machines 1 which are not operating is received from the control apparatus 2. In step S4, it is checked whether or not the money processing machines 1 corresponding to the received ID information are operating. If the check result is "YES" (not operating), that is, if the ID information received from the control apparatus 2 corresponds to the ID information received at step S1, a current operation proceeds to step S5. If the check result is "NO" (operating), that is, if the ID information received from the control apparatus 2 does not correspond to the ID information received at step S1, a current operation returns to step S1 and repeats the above-described operations.

After that, in step S5, the received ID information and a time at which this ID information was received are stored in the memory. In step S6 (an alarm output unit), an alarm signal is output to the alarm apparatus 9 and the operation is returned.

In accordance with a constitution of this embodiment described above, even in a case in which a power supply to the money processing machine 1 is stopped, if a power supply to the control apparatus 2 and the reader monitoring apparatus 3 is still continued, predetermined electric waves from the RFID reader 4 are output or transmitted inside the room R in which the money processing machines 1 are set, and an electromotive force is generated at the antenna 8 when the predetermined electric waves are received. After that, if the open/close portion 5 of the money processing machine 1 is opened, the predetermined electric waves reach the antenna 8 via this opened space portion, and the IC chip 7 is activated by using the electric power which is inducted or caused at the antenna 8 and is supplied to the IC chip 7.

After that, when the IC chip 7 is activated, the ID information is transmitted as radio waves via the antenna 8. The transmitted ID information is transmitted or passes outside the money processing machine 1 via the opened space portion of the open/close portion 5, and is received by the RFID reader 4. The reader monitoring apparatus 3 determines the money processing machine 1 in accordance with the received ID information, and in a case in which the determined money processing machine 1 is not operating, the reader monitoring apparatus 3 determines or detects that the open/close portion 5 of the money processing which is not operating is opened. In such a case, the ID information and the reception time are stored in the memory, and moreover, an alarm signal is transmitted to the alarm apparatus 9 and the control apparatus 2. When the alarm apparatus 9 receives this alarm signal, the alarm apparatus 9 operates the speaker 12 and the revolving lamp 13 in order to raise an alarm, and the control apparatus 2 transmits an alarm signal to the monitoring center 11 via the communication apparatus 10. It should be noted that, in this operation, if the money processing machine 1 is operating, the money processing machine 1 detects that the open/close portion 5 is opened and records as log data.

Therefore, in accordance with the above-described first embodiment, when the open/close portion 5 of the money processing machine 1 is opened and the ID information is transmitted to the RFID reader 4 from the RFID inlet 6 corresponding to the open/close portion 5, the ID information is received by the RFID reader 4. Hence, it is possible to check or monitor whether or not the open/close portion 5 is opened without providing a power line of a battery for a sensor. Moreover, it is easy to move a position of the money processing machine 1 because a line for a sensor between a main body of the monitoring apparatus and the money processing machine 1 is not necessary. Moreover, a power source such as a battery is not necessary inside the case 1*a*. Therefore, it is possible to reduce a number of components or parts and to reduce frequency of maintenance, and therefore, it is possible to decrease costs and to make the case 1*a* smaller.

Moreover, it is possible to determine the RFID inlet 6 which has transmitted the ID information based on the received ID information by the RFID reader 4 because the different ID information is stored for each of the RFID inlets 6. Moreover, it is possible to determine both the open/close portion 5 which is opened and the money processing machine 1 which provides this open/close portion 5 because the RFID inlet 6 is determined. Furthermore, it is possible to selectively monitor the open/close portion 5 of the money processing machine 1 which is not operating because it is possible to output an alarm signal if the detected money processing machine 1 is not operating. As a result, it is possible to prevent the alarm from being unnecessarily raised when some of the open/close portions 5 of the operating money processing machines 1 are opened.

Moreover, it is possible to determine the money processing machine 1 and the open/close portion 5 to which the RFID inlet is attached based on the ID information received by the RFID reader 4. Therefore, it is possible to quickly cope with a problem with respect to the money processing machine 1 and the open/close portion 5 based on the output alarm signal.

And moreover, it is possible to determine that a position to which the RDIF inlet 6 is attached is a door, a drawer or the like based on the ID information. Therefore, for example, even if multiple open/close portions 5 such as a door, a drawer and the like are provided at the money processing machine 1, it is possible to determine if the open/close portion 5 which is opened is a door, drawer or the like, and it is possible to quickly cope with a problem of the money processing machine 1 in which it is determined that the open/close portion 5 is opened.

Furthermore, it is possible to record or store a time at which the ID information is received together with the ID information. Therefore, it is possible to confirm the stored or recorded ID information and the time at which the ID information was stored or recorded, and as a result, it is possible to reconfirm the time at which an illegal or unauthorized opening of the open/close portion 5 was detected.

And moreover, when the open/close portion 5 is closed, a predetermined electric waves are blocked by the shielding material S and the predetermined electric waves do not reach the RFID inlet 6. On the other hand, when the open/close portion 5 is opened, predetermined electric waves are not blocked by the shielding material S, the predetermined electric waves reach the RFID inlet 6, and the RFID inlet is activated. Therefore, it is possible to receive the ID information by the RFID reader 4 only when the open/close portion 5 is opened, and as a result, it is possible to easily detect that the open/close portion 5 is opened.

Moreover, if the open/close portion 5 of the money processing machine 1 which is not operating is opened, it is possible to raise an alarm by using the speaker 12, revolving lamp 13 and the like. Therefore, this alarm can be a warning for a person who is conducting an illegal operation, and as a result, it is possible to increase effects of preventing crimes.

Moreover, if the open/close portion 5 of the money processing machine 1 which is not operating is opened and the alarm signal is output, it is possible to automatically inform of or report a problem to the monitoring center 11 via the communication apparatus 10. Therefore, for example, it is possible to quickly send there a security guard, and it is possible to increase security.

Moreover, it is possible to receive the ID information transmitted from the RFID inlet 6 by using the RFID readers 4 which are possible to receive among the multiple RFID readers 4 provided beforehand. Therefore, it is possible to accurately detect when the open/close portion 5 of the money processing machine 1 is opened without being affected from status of electric waves, and as a result, it is possible to increase reliability of monitoring.

It should be noted that in the above-described embodiment, only an example is explained in which the present invention is applied to the money processing machine 1. However, the present invention is not limited to the money processing machine 1 and it is possible to apply the present invention to an apparatus which provides an open/close portion.

Moreover, a case is explained above in which the alarm apparatus 9 is connected to the monitoring apparatus 3. However, it is possible that the alarm apparatus 9 be connected to the control apparatus 2. Moreover, it is possible that the communication apparatus 10 which is connected to the control apparatus 2 be connected to the monitoring apparatus 3. Furthermore, a detection operation of output of the alarm signal is conducted by the reader monitoring apparatus 3 in the above-described embodiment. However, it is possible that the control apparatus 2 conduct this detection operation.

Moreover, a case of independently providing both the reader monitoring apparatus 3 and the control apparatus 2 is explained above. However, it is possible to integrally constitute both of them.

Moreover, instead of blocking the predetermined electric waves, it is possible to apply a constitution in which the alarm information is blocked from reaching the RFID reader 4 if the open/close portion 5 is closed by applying a shielding material S which blocks electric waves including the alarm information transmitted from the RFID inlet 6.

Moreover, in general, the money processing machine 1 is constituted so as to be able to communicate with an accounting system via a control panel, that is, the money processing machine 1 is constituted as a portion of a so-called online system, or the money processing machine 1 is connected to a control system inside a bank via a LAN inside an office. It is possible that an operation status of the money processing machine 1 be monitored via such systems instead of the control apparatus 2.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the description, and is only limited by the scope of the appended claims.

What is claimed is:

1. A monitoring apparatus for monitoring an open/close status of open/close portions of multiple money processing machines, comprising:

an open/close detection unit which detects the open/close status of the open/close portion of each of the multiple money processing machines and which comprises: an RFID inlet which stores individually different ID information, which transmits radio waves and which is attached to each of the multiple money processing machines behind the open/close portion; and an RFID reader which detects the radio waves transmitted from the RFID inlet via the open/close portion only if the open/close portion is opened and which is independently provided outside the money processing machine;

an operation status monitoring system monitoring an operation status of each of the multiple money processing machines; and an alarm output unit which outputs an alarm signal if the open/close detection unit detects that the open/close portion is opened based on the radio waves and if the operation status monitoring system determines that the money processing machine is not operating, wherein the operation status monitoring system successively transmits a first signal to each of the money processing machines in a predetermined interval, and the operation status monitoring system determines an operation state of each of the money processing machines based on whether or not a second signal transmitted from the money processing machine in response to the first signal is detected.

2. A monitoring apparatus according to claim 1 wherein the ID information comprises information for detecting or determining the money processing machine and the open/close portion to which the RFID inlet is provided.

3. A monitoring apparatus according to claim 1 wherein the open/close portion is a drawer, and the ID information comprises information indicating or corresponding to the drawer.

4. A monitoring apparatus according to claim 1 wherein the open/close portion is a door, and the ID information comprises information indicating or corresponding to the door.

5. A monitoring apparatus according to claim 1 further comprising a memory unit which stores or records the ID information and a time at which the ID information was received by the RFID reader.

6. A monitoring apparatus according to claim 1, wherein a case of the money processing machine and the open/close portion comprise shielding materials.

7. A monitoring apparatus according to claim 1 further comprising an alarm unit which raises an alarm based on the alarm signal.

8. A monitoring apparatus according to claim 1 further comprising a communication unit for transmitting the alarm signal to a monitoring center.

9. A monitoring apparatus according to claim 1 wherein the monitoring apparatus includes a plurality of the RFID readers.

10. A monitoring apparatus according to claim 1 wherein the open/close detection unit detects each of a plurality of the open/close portions which is open by using the ID information.

11. A monitoring system comprising:

a plurality of money processing machines each of which includes at least one open/close portion;

an RFID inlet which stores individually different ID information, which transmits radio waves and which is attached to each of the money processing machines behind the open/close portion;

an RFID reader which detects the radio waves transmitted from the RFID inlet via the open/close portion only if the open/close portion is opened and which is independently provided outside the money processing machine;

an open/close detection portion which is provided outside the money processing machines and which detects open/close status of the open/close portion of each of said plurality of money processing machines;

an operation status monitoring portion which is provided outside the money processing machines, which successively transmits a first signal to each of the money processing machines in a predetermined interval and which monitors and determines an operation state of each of the money processing machines based on whether or not a second signal transmitted from the money processing machine in response to the first signal is detected; and an alarm output portion which outputs an alarm signal if the open/close detection portion detects that the open/close portion is opened based on the radio waves and if the operation status monitoring portion determines that the money processing machine is not operating.

* * * * *